A. P. WINSLOW.

Car-Roof.

No. 6,401. Reissued April 27, 1875.

Witnesses.

Mills W. Leggett

Walter Miller

Inventor:

A. P. Winslow.

By Leggett & Leggett Attorneys.

UNITED STATES PATENT OFFICE.

A. P. WINSLOW, OF CLEVELAND, OHIO.

IMPROVEMENT IN CAR-ROOFS.

Specification forming part of Letters Patent No. 25,071, dated August 9, 1859; reissue No. 2,050, dated August 8, 1865; extended seven years; reissue No. 6,401, dated April 27, 1875; application filed March 8, 1875.

*To all whom it may concern:*

Be it known that I, A. P. WINSLOW, of Cleveland, county of Cuyahoga, State of Ohio, have invented a certain new and useful Improvement in Roofs for Railroad-Cars and Hurricane-Decks of Vessels; and the following is declared to be a full, clear, and exact description thereof, reference being had to the accompanying drawings, which form a part of this specification.

The invention consists, first, in the forming of the said roof of an under-layer of metals and a covering of boards; second, in the forming of the said metallic layer of corrugated metal; third, in a car-roof formed of an under-layer of metal and an upper layer of boards, with an intermediate air-space; fourth, in forming the said roof with an under-layer of metal and a covering of boards, and an intermediate air-space, the said air-space to communicate with the external air, so as to maintain a circulation; fifth, in forming the said under-layer of separate and removable metallic plates, covered with boards, and whether or not there is an air-space.

Figure 1:
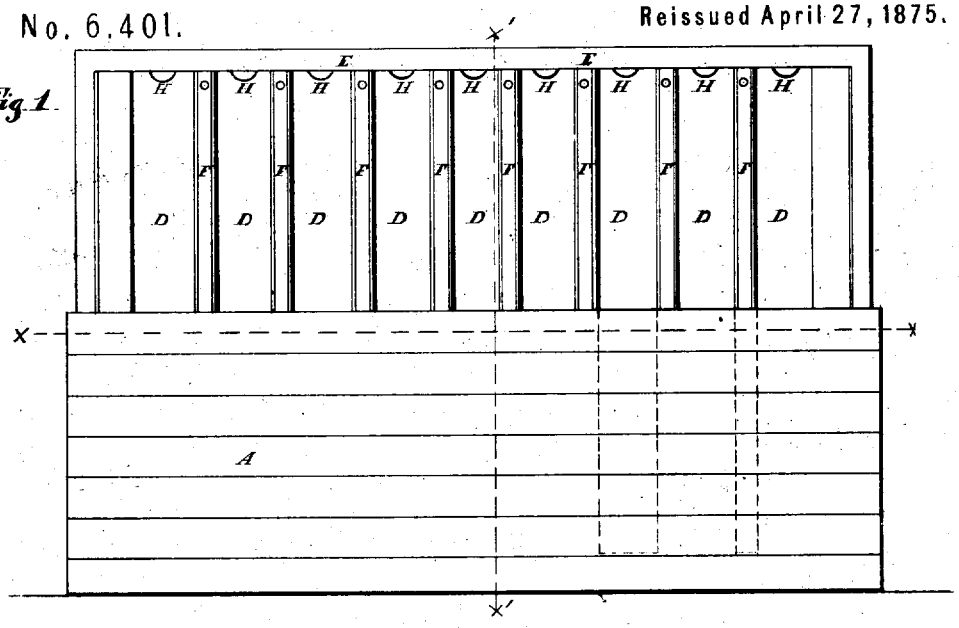
Figure 1:
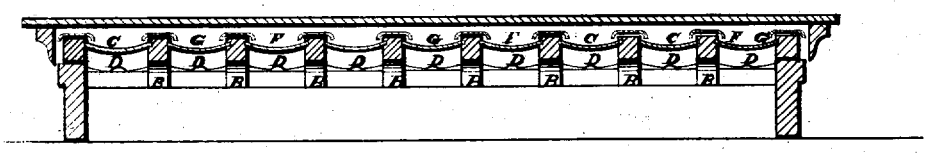
Figure 1:
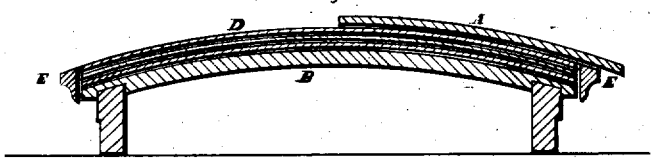
Figure 1:
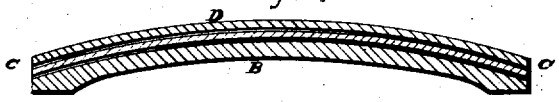
Figure 1:
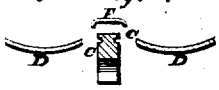

In the drawings, Figure 1 is a plan view. Fig. 2 is a longitudinal section in the direction of the line $x$ $x$ in Fig. 1. Fig. 3 is a transverse section in the direction of the line $x'$ $x'$ in Fig. 1. Figs. 4 and 5 are detached sections, which will be referred to in the following description.

Similar letters of reference in the several figures denote similar parts.

The outside covering A of Figs. 1, 2, and 3 of the roof may be of wood, covered over in the usual manner.

In Fig. 1 a portion of this outside roof is removed for the purpose of showing my improvements.

The rafters B may be made and connected to a railroad-car, or the upper cabin of vessels, in any desirable manner suitable for this purpose. In the sides of each rafter is cut a groove, C, Fig. 4, the curve of which conforms to the top of the rafter, and extends the entire length of it, as seen in Fig. 5. Between the rafters in the grooves is placed a metallic plate or sheet, D, which in the drawings extends the entire length across the car, as indicated in Figs. 1, 3, 5. The ends of the plates D extend over the sides of the car or cabin to the inside of the molding or cornice E of the roof. This cornice prevents the plates D from sliding longitudinally out of place. On the top of each rafter is fastened the cap F, which in the drawings extends the whole length of the rafter, as seen in Fig. 3. The sides of this cap are so turned that they lap down upon the plates D, as seen in Fig. 2.

The plates, hereinbefore shown, are curved, for the purpose of conveying all moisture or wet that may get in the roof A to the center of the plates from the sides and grooves. Straight, angular, or corrugated plates may be employed instead of plates D; but the latter is preferred, as it is considered better adapted to the purposes designed.

Between the roof or sheeting A and the plates D is formed an air-chamber, G, into which a current of air is continually passing through openings H at each end of the plates. Through these openings is discharged all wet, dust, &c., which may be gathered in the chambers. The chambers being open to the atmosphere by means of the openings H, the interior of the car is rendered much more cool and comfortable than when the sun strikes upon a single roof and the heated air is confined.

The plates are made to fit not tightly in the grooves, but so that they will move readily, and adjust themselves to the straining and springing of the car or vessel, and so that, in case one of the plates should become injured, it may be easily withdrawn and replaced.

In the ordinary modes of covering roofs of cars with tin or iron the strain and continued jarring of the cars and the expansion and contraction crack and loosen the metallic sheets from the roof. Then leakage follows, which does more or less damage, particularly on freight-cars, as the goods become injured to a greater or less extent when thus exposed, and when the roof is composed entirely of wood the joints or seams become opened by exposure to the weather and racking of the cars, which again exposes the freight to injury. Again, the wood roof is at all times liable to be fired by sparks from the engine.

With my improved roof these difficulties are obviated, as all leakage from the roof A is conveyed by the plates D through the openings H, and in case the roof A be fired the metallic roof below will prevent the fire from injuring the freight, so that the train can be stopped and the fire subdued without injuring the lower roof or the goods. This manner of constructing the roofs of railroad-cars is much less expensive and more durable than the ordinary metallic roofing, and it may be applied to the hurricane-decks of steamboats, propellers, and other vessels using cabins with hurricane-decks. All structures of this kind are more or less subject to a continual strain and racking of the timbers, and this roof, by its peculiar construction, is rendered flexible to a certain extent, and will adjust itself to the working of the car or vessel.

The outside sheeting A may be placed over the metallic sheeting, either transversely, as shown, or longitudinally with the said metallic plates; and in place of being curved, as represented, it may be in the angular form of an ordinary roof.

It is admitted that roofs have been covered with metal, but it is believed that a car or steamboat roof has never before been made of iron underneath with a covering of boards; nor is it believed that a car or steamboat roof has ever before been made of corrugated iron and a covering of boards, nor that a car or steamboat roof has ever before been made of iron underneath and a covering of boards separated from each other, so as to leave the air-space between the two; nor is it believed that such a roof has ever before been made with iron underneath and a board covering above, with an air-space between the two, and an opening from the said air-space to the exterior to permit a circulation of air, nor that such a roof has ever before been made of separate and removable metallic plates covered with boards, either with or without an air-space.

What is claimed as new is—

1. A car or steamboat roof formed of two layers, that underneath being metallic, that on top wood, substantially as and for the purpose set forth.

2. A car or steamboat roof composed of an under surface of metal, an upper layer of wood, and an intermediate air-space, substantially as and for the purposes set forth.

3. A car or steamboat roof composed of an under surface of metal, an upper surface of wood, an intermediate air-space, the said air-space communicating with the exterior air, whereby a circulation is maintained, substantially as and for the purposes set forth.

4. A car or steamboat roof composed of an under surface of corrugated metal and an upper surface of boards, substantially as and for the purposes set forth.

5. A car or steamboat roof consisting of an under surface of separate metallic plates, D, and an upper surface of boards, substantially as and for the purpose set forth.

6. A car or steamboat roof consisting of an under surface of separate metallic plates, an upper surface of wood, and an intermediate air-space, substantially as and for the purposes set forth.

7. A car or steamboat roof consisting of an under surface of separate removable metallic plates and an upper surface of wood, substantially as and for the purposes set forth.

8. A car or steamboat roof consisting of an under layer of separate metallic plates D, rafters B, and an upper surface of boards, substantially as and for the purposes set forth.

9. The combination, with the plates D and rafters B, of cap-plates F, substantially as and for the purposes set forth.

10. The combination, with the plates D, board covering A, and the rafters B, made to project above the said plates, of orifices H, substantially as and for the purpose set forth.

A. P. WINSLOW.

Witnesses:

M. H. DODGE,

W. E. SHERWOOD.